(12) United States Patent
Chowdhury

(10) Patent No.: US 6,607,474 B2
(45) Date of Patent: Aug. 19, 2003

(54) METHOD FOR STABILIZING CHROMIUM-CONTAMINATED MATERIALS

(75) Inventor: Ajit K. Chowdhury, Madison, WI (US)

(73) Assignee: RMT, Inc., Madison, WI (US)

( * ) Notice: Subject to any disclaimer, the term of this patent is extended or adjusted under 35 U.S.C. 154(b) by 0 days.

(21) Appl. No.: 09/892,257

(22) Filed: Jun. 27, 2001

(65) Prior Publication Data

US 2002/0049361 A1 Apr. 25, 2002

Related U.S. Application Data

(60) Provisional application No. 60/215,776, filed on Jun. 30, 2000.

(51) Int. Cl.$^7$ .................................................. A62D 3/00
(52) U.S. Cl. ................. 588/256; 405/128.5; 405/129.3; 210/747; 210/761
(58) Field of Search ................ 210/747, 761; 588/256; 405/129.25, 129.3, 128.5, 128.75

(56) References Cited

U.S. PATENT DOCUMENTS

| | | | | |
|---|---|---|---|---|
| 2,829,964 A | * | 4/1958 | Zimmerley et al | 210/620 |
| 3,294,680 A | * | 12/1966 | Lancy | 210/720 |
| 3,824,084 A | * | 7/1974 | Dillon et al. | 201/17 |
| 3,834,760 A | * | 9/1974 | Spedden et al. | 166/280 |
| 3,981,965 A | | 9/1976 | Gancy et al. | |
| 4,083,696 A | * | 4/1978 | Cole et al. | 201/17 |
| 4,139,460 A | | 2/1979 | Ghelli | |
| 4,422,943 A | * | 12/1983 | Fender et al. | 210/716 |
| 4,466,882 A | * | 8/1984 | Audeh et al. | 208/425 |
| 4,504,321 A | | 3/1985 | Kapland et al. | |
| 4,511,362 A | * | 4/1985 | Ravindram et al. | 201/17 |
| 4,765,827 A | * | 8/1988 | Clough et al. | 75/732 |
| 4,891,132 A | * | 1/1990 | Czenkusch | 208/391 |
| 4,954,168 A | | 9/1990 | Crnojevich et al. | |
| 5,007,960 A | | 4/1991 | Baturay et al. | |
| 5,155,042 A | | 10/1992 | Lupton et al. | |
| 5,202,033 A | * | 4/1993 | Stanforth et al. | 210/747 |
| 5,204,073 A | | 4/1993 | Zhong et al. | |
| 5,285,000 A | | 2/1994 | Schwitzgebel | |
| 5,304,710 A | | 4/1994 | Kigel et al. | |
| 5,362,394 A | * | 11/1994 | Blowes et al. | 210/617 |
| 5,380,441 A | * | 1/1995 | Thornton | 205/673 |
| 5,562,588 A | | 10/1996 | Higgins | |
| 5,676,733 A | * | 10/1997 | Kohr | 423/29 |
| 5,928,406 A | | 7/1999 | Salt et al. | |
| 5,951,457 A | * | 9/1999 | James | 210/747 |
| 6,238,570 B1 | | 5/2001 | Sivavec | |
| 6,277,414 B1 | * | 8/2001 | Elhaik et al. | 210/749 |
| 6,319,389 B1 | * | 11/2001 | Fountain et al. | 205/583 |

OTHER PUBLICATIONS

Banerjee et al., "Super Successful," *Industrial Wastewater* Mar./Apr. 20–24, (2001).

James, Bruce R., "Hexavalent Chromium Solubility and Reduction in Alkaline Soils Enriched with Chromite Ore Processing Residue," *J. Environ. Qual.* 23:227–233 (1994).

* cited by examiner

*Primary Examiner*—J. J. Swann
*Assistant Examiner*—Katherine W Mitchell
(74) *Attorney, Agent, or Firm*—Quarles & Brady LLP

(57) ABSTRACT

A method for stabilizing chromium in a chromium-contaminated waste matrix characterized by high concentrations of alkaline material (such as lime) includes the steps of contacting a source of hexavalent chromium with a source of ferrous ions to produce ferric ions; oxidizing iron pyrite to produce ferrous sulfate and sulfuric acid; and contacting the alkaline chromium-contaminated particulate matter with the ferrous sulfate and the sulfuric acid for a time sufficient to convert ferrous sulfate into ferric sulfate and to reduce mobile hexavalent chromium to non-leachable trivalent chromium. The method is integrated in that ferrous sulfate produced by oxidizing iron pyrite serves as a source of ferrous ions in the first contacting step.

22 Claims, 6 Drawing Sheets

METHOD FOR STABILIZING CHROMIUM-CONTAMINATED MATERIALS

CROSS-REFERENCE TO RELATED APPLICATIONS

This application claims the benefit of Provisional Application No. 60/215,776, filed Jun. 30, 2000.

STATEMENT REGARDING FEDERALLY SPONSORED RESEARCH OR DEVELOPMENT

Not applicable.

BACKGROUND OF THE INVENTION

The present invention relates to methods for reducing the leaching potential of environmental chromium-contaminated particulate matter to acceptable levels. More particularly, this invention describes methods for stabilizing hexavalent chromium in chromium-contaminated materials.

In the environment, chromium exists predominantly in two forms—hexavalent chromium and trivalent chromium. Trivalent chromium is significantly more stable than hexavalent chromium, which is highly mobile. It is known that a near-neutral pH is required to keep trivalent chromium in a stable, insoluble state. Hexavalent chromium is a known human carcinogen, a RCRA hazardous material, and a common contaminant on the Comprehensive Environmental Response, Compensation, and Liability Act (CERCLA) Priority List of Hazardous Substances. Although chromium metal, like other metals, exhibits a positive valence state, hexavalent chromium is typically present in the environment as an oxy-anion such as chromate ($CrO_4^{2-}$) or dichromate ($Cr_2O_7^{2-}$). As a result, technologies that effectively treat other cationic metals do not effectively stabilize chromium. The oxidation state of chromium, the oxidation-reduction potential (ORP) and the pH of the waste material are key parameters for controlling the leaching potential of chromium in the environment.

Reducing agents such as ferrous sulfate can stabilize hexavalent chromium in some environments. However, in alkaline environments, ordinary ferrous sulfate treatment of certain chromium-bearing wastes, including chromium ore processing residue (COPR), reduces chromium leachability for only a short time after treatment. Over time, the pH of the waste matrix slowly rises due to the high alkaline (e.g., lime) content, and chromium again leaches from the waste.

Other known approaches for stabilizing alkaline COPR have included reduction with manganese nitrate, lactic acid, steel wool, or hardwood tree leaf litter (James, B. R., Hexavalent Chromium Solubility and Reduction in Alkaline Soils Enriched with Chromite Ore Processing Residue, *J. Environ. Qual.* 22:227-233 (1994)), reduction with sulfide ions (U.S. Pat. No. 3,981,965), adjustment of pH followed by the addition of organic material (U.S. Pat. No. 5,562,588), mixing with mud or dredged sediment and ground blast furnace slag (U.S. Pat. No. 4,504,321), in situ treatment with the addition of ferrous sulfate (U.S. Pat. No. 5,202,033), treatment with ferrous iron followed by the addition of silicate solution (U.S. Pat. No. 5,285,000), and treatment with ascorbic acid (U.S. Patent No. 5,951,457).

It is known that simultaneous combination of a pH control agent and an agent for controlling oxidation-reduction potential (ORP) with chromium-contaminated waste can reduce hexavalent chromium to the less mobile trivalent state. A combination of sulfuric acid for pH control and ferrous sulfate for ORP control has been used for this purpose, as have hydrochloric acid and iron chloride, respectively. A convenient source of these agents is "pickle liquor" from sulfuric acid-based or hydrochloric acid-based metal processing/finishing operations. Alternatively, $FeSO_4$ and $H_2SO_4$ are known to be generated by controlled oxidation of iron pyrite ($FeS_2$).

Cost-effective, permanent stabilizing of alkaline chromium-contaminated particulate matter has not been achieved, in part as a result of a need to convey large quantities of reactants to a stabilization site.

BRIEF SUMMARY OF THE INVENTION

The present invention is summarized in that an improved process for stabilizing chromium-contaminated particulate matter and reducing chromium leaching to acceptable levels integrates previously separate processes for (1) preparing the ferrous sulfate and sulfuric acid reactants and (2) using byproducts of the stabilization process to produce additional reactants, thereby reducing or eliminating dependence upon external reactant sources.

A major objective of the invention is cost-effective, long-term, permanent stabilization of chromium in a chromium-contaminated waste matrix characterized by high concentrations of alkaline material (such as lime), where the waste can contain both trivalent and hexavalent chromium.

In the integrated process of the present invention, ferrous sulfate and sulfuric acid are used to stabilize hexavalent chromium in an alkaline environment. Iron pyrite is oxidized to produce the ferrous sulfate and sulfuric acid. The iron pyrite can be oxidized by treating it with soluble ferric ions, preferably provided as a ferric salt, such as ferric sulfate, which is itself produced as a byproduct of a reduction process wherein ferrous sulfate is used to reduce hexavalent chromium to trivalent chromium. Other pyrite oxidation means are also disclosed.

The invention will be understood by referring to the detailed description of the invention, read in conjunction with the accompanying drawings.

DETAILED DESCRIPTION OF THE INVENTION

Figure 1:
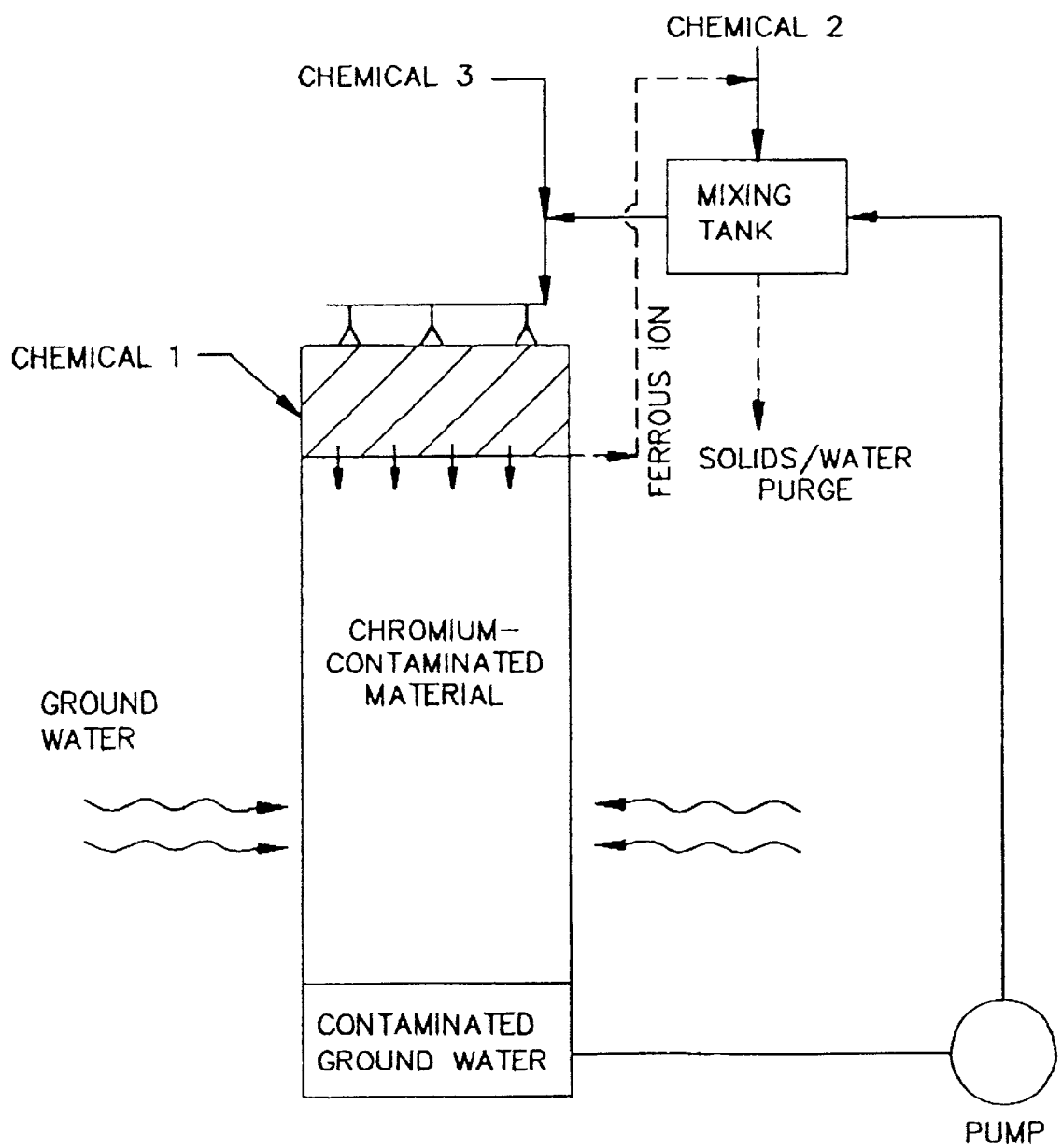
FIG. 1 depicts an in situ system for stabilizing chromium in a chromium-contaminated material wherein a ferric salt is produced by reducing chromium from contaminated groundwater using a source of ferrous ions. The ferric salt, in turn, can oxidize iron pyrite to produce ferrous sulfate and sulfuric acid. The latter compounds are in fluid communication with the chromium-contaminated material and can stabilize the chromium in its trivalent form. In addition, ferrous ions produced in the oxidation of iron pyrite can be further oxidized to a ferric salt by mixing the ferrous ions with contaminated groundwater, whereupon the integrated oxidation-reduction process can continue. Additional ferrous ions (chemical 2) or ferric salt (chemical 3) can be added if needed.

The present invention describes a cost effective, permanent process for stabilizing chromium-contaminated particulate matter in an alkaline waste matrix. The waste matrix can include alkaline chromium ore processing residue (COPR), chromium-contaminated soil, sediment, industrial waste, sludge, fill material, or any other particulate material. The method permanently reduces chromium leachability to levels below the TCLP toxicity threshold of 5 mg/L or below the threshold of any other site-specific leaching criteria, such as SPLP, ASTM water leach, etc.

In the process, an alkaline chromium-contaminated particulate waste matrix is contacted simultaneously with an amount of acid sufficient to substantially neutralize the alkali (lime) content and with an amount of a reducing agent sufficient to convert substantially all of the hexavalent chromium in the waste matrix to its trivalent form. Reducing the waste matrix pH to near neutral levels and converting the chromium into its trivalent form permanently stabilizes the waste and minimizes chromium leaching. The addition rate of the reducing agent and the pH control agent can be controlled to maintain a waste matrix pore water ORP and pH to minimize the leaching potential of chromium.

A preferred pH control agent for stabilizing alkaline chromium-contaminated particulate matter is sulfuric acid, and a preferred ORP control agent for reducing hexavalent chromium is ferrous sulfate. Ferrous sulfate may also function as a pH control agent. Commercially available sulfuric acid and ferrous sulfate may be used in the stabilization process. Alternatively, a convenient source of both sulfuric acid and ferrous sulfate is "pickle liquor," as described above.

The chromium stabilization process may be used in situ or ex situ for disposed wastes, fill material, sediment, contaminated soil, etc., depending on specific site conditions. Although in situ treatment is not required in the method, it can offer significant advantages, especially when stabilizing highly alkaline chromium-contaminated wastes or where it is inconvenient to haul enormous quantities of acidic material to the site. This can be a major disadvantage for stabilization sites in urban areas.

The present invention desirably permits one to generate both the reducing agent and the acid on-site or in situ. For in situ stabilization, the treatment chemicals can be added to the top of a waste column and the waste will be stabilized as the chemicals flow down the waste column. This is accomplished in the present invention by controlled oxidation of iron pyrite according to the following simplified equation:

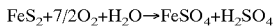

$$FeS_2 + 7/2 O_2 + H_2O \rightarrow FeSO_4 + H_2SO_4$$

Approximately 1.27 tons of ferrous sulfate and 0.82 ton of sulfuric acid may be produced by the oxidation of 1 ton of iron pyrite. This amount of ferrous sulfate is equivalent to approximately 12.7 tons, or one-half a truckload, of pickle liquor containing approximately 10 percent ferrous sulfate. Therefore, substantial transportation and material handling costs may be saved by generating the treatment chemical components on-site.

FIG. 1 depicts a simplified schematic depiction of a basic in situ stabilization plan for disposed alkaline chromium-contaminated waste with in situ generation of ferrous sulfate and sulfuric acid. In FIG. 1, the waste may be any alkaline chromium-contaminated particulate matter such as chromium ore processing residue (COPR) and the like.

Figure 2:
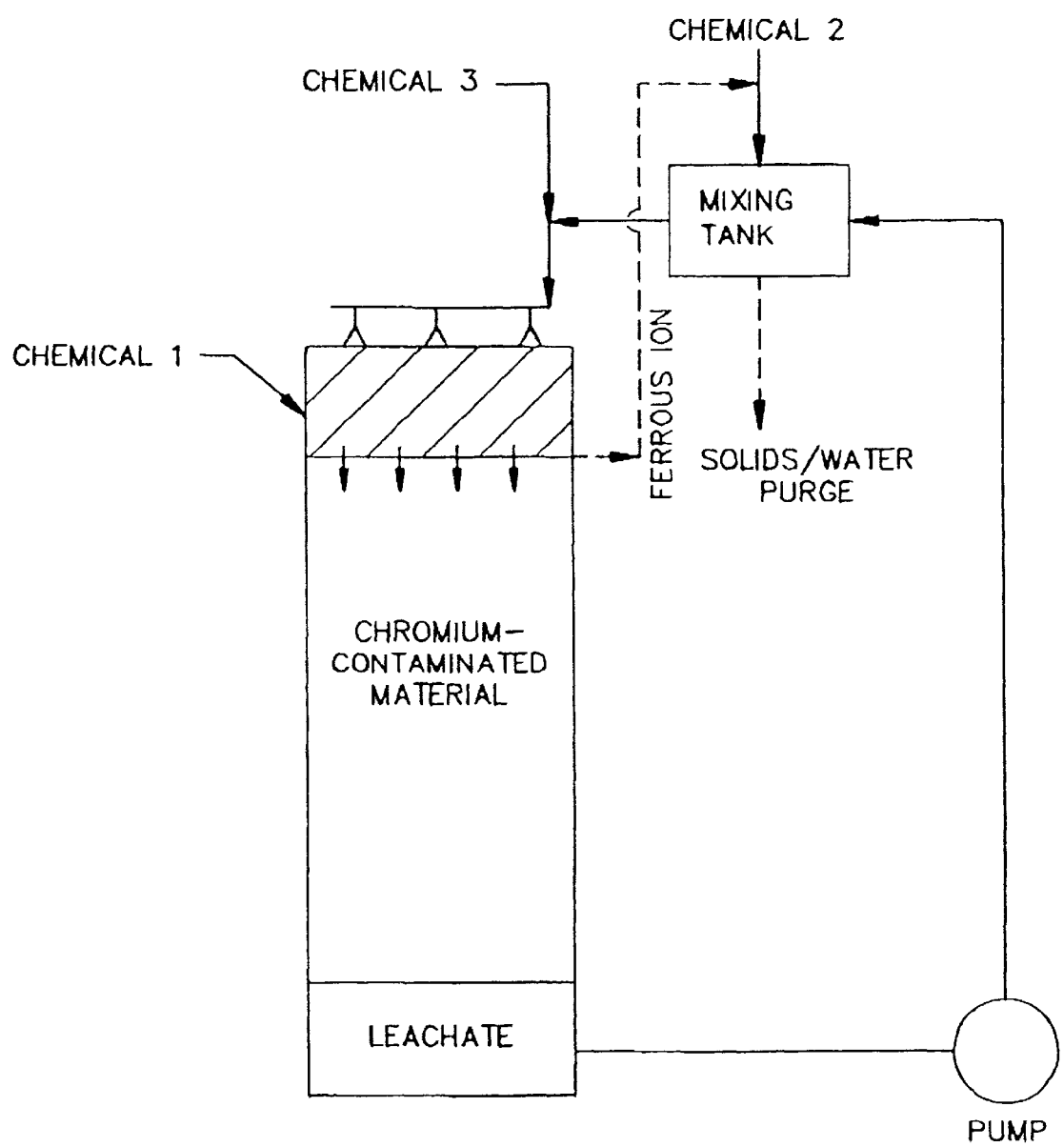
FIG. 2 depicts a variation on the in situ system of FIG. 1, wherein the chromium-contaminated material is not in the groundwater. In this variant embodiment, water is passed through the chromium-contaminated material until a contaminated leachate is recovered and combined with ferrous ions, as above. Thereafter, the reactions proceed as shown in FIG. 1.

Groundwater contaminated with hexavalent chromium is pumped to a mixing tank where it is brought into contact with ferrous sulfate ($FeSO_4$; chemical 2) or pickle liquor to reduce the chromium to its trivalent form. Ferrous sulfate is added to the mixing tank at a controlled rate to maintain recycle water pH in the acidic range. During this reduction process, ferrous iron is converted to ferric iron. Particulate solids are removed from the mixture and water containing ferric iron is recycled to the pyrite layer (identified as chemical 1) to catalyze iron pyrite oxidation. Additional ferric iron (chemical 3) can be added to the recycle water prior to contact with iron pyrite (chemical 1). Low pH of the recycle water along with ferric iron catalyzes iron pyrite oxidation and produces ferrous sulfate and sulfuric acid, which flows downward and stabilizes the underlying chromium-contaminated material. The rate of stabilization of the waste column can be controlled by controlling the flow rate, pH, and ferric iron concentration in the recycle water which in turn controls the oxidation of iron pyrite to ferrous sulfate and sulfuric acid. The treatment cycle continues until the groundwater pH is near neutral and contains hexavalent chromium at levels below a desired toxicity threshold. Where no groundwater is encountered, leachate generated from the waste column is recirculated in a similar manner, as is shown in FIG. 2.

Figure 3:
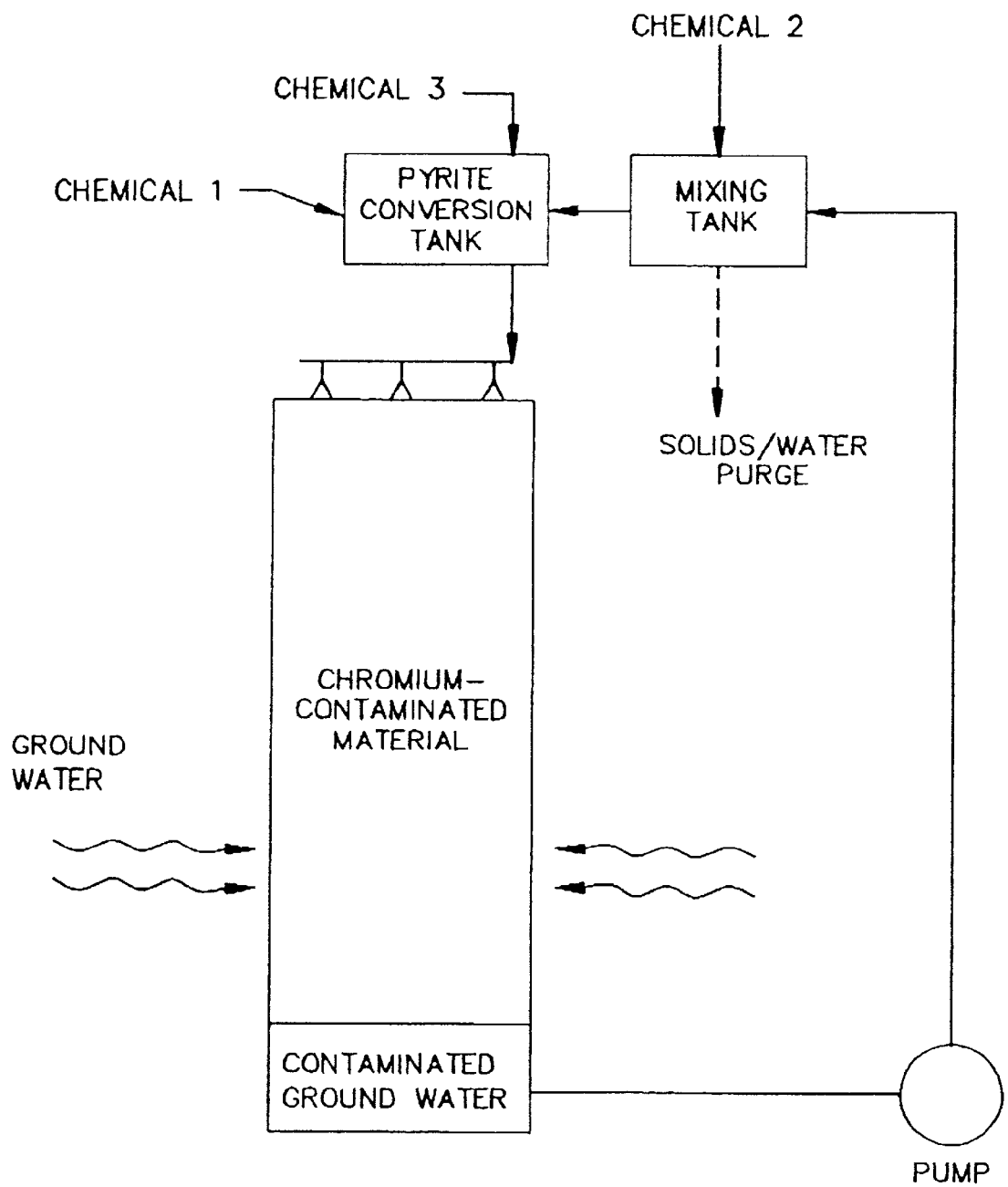
FIG. 3 depicts another variation on the in situ system of FIG. 1 wherein the iron pyrite is not provided on top of the chromium-contaminated matter, but rather is oxidized separately, though still in fluid communication with the chromium-contaminated matter.

In a related embodiment, the iron pyrite can be oxidized ex situ using recycled contaminated groundwater (FIG. 3) or leachate to produce ferrous sulfate and sulfuric acid that can subsequently be added or injected to the chromium-contaminated waste as in the previous embodiments. Alternatively, the ex situ iron pyrite oxidation may be carried out by oxidation processes such as wet oxidation or wet air oxidation.

Figure 4:
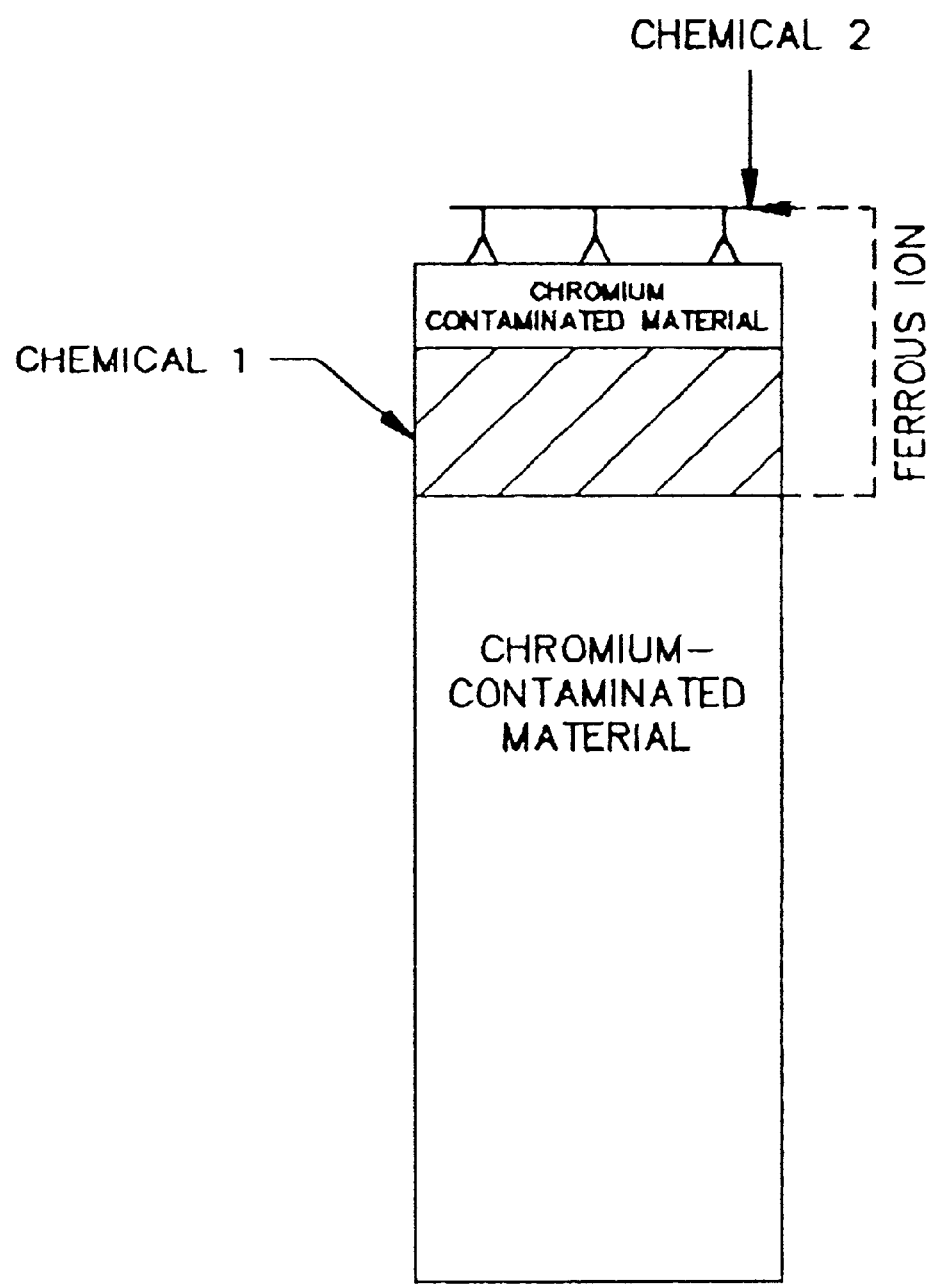
FIG. 4 depicts yet another variation on the in situ system of FIG. 1 wherein a portion of the chromium-contaminated matter is provided on top of the pyrite layer. In this variation, ferric ions produced in treating the top layer of chromium-contaminated matter enter and promote oxidation of the iron pyrite layer. Further, ferrous ions produced in oxidizing the iron pyrite layer are recycled onto and react with the top layer of chromium-contaminated matter to produce additional ferric ions.

In yet another embodiment of the present invention, depicted in FIG. 4, ferrous sulfate is brought into contact with chromium-contaminated waste to produce a ferric salt solution that is then brought into contact with iron pyrite to enhance the oxidation of the iron pyrite.

Figure 5:
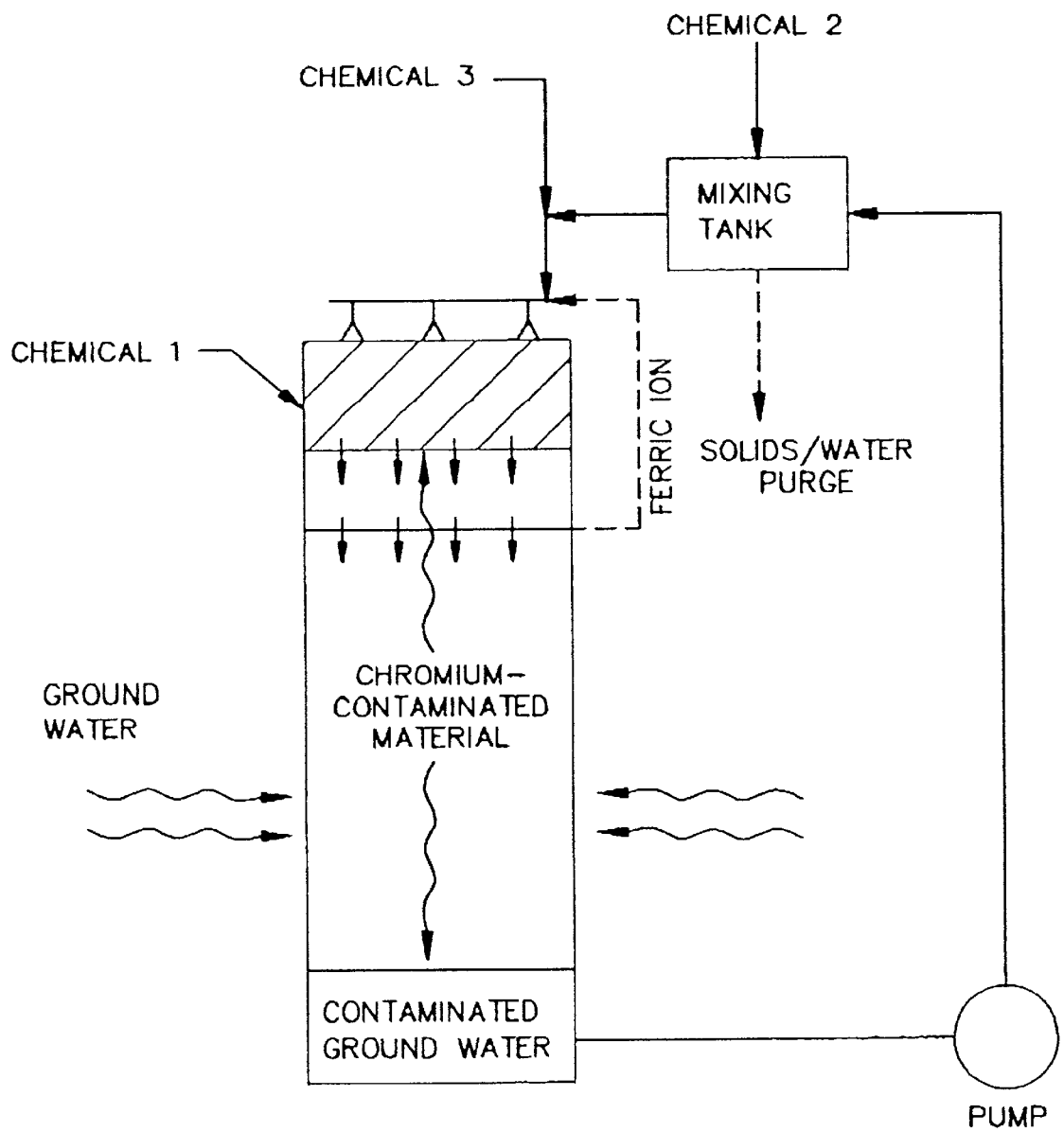
FIG. 5 depicts yet another variation on the in situ system of FIG. 1 wherein ferric ions are withdrawn from a treatment zone near the top of the chromium-contaminated matter and are delivered to the iron pyrite layer to further promote oxidation of the iron pyrite into ferrous sulfate and sulfuric acid.

In another embodiment, shown in FIG. 5, iron pyrite in fluid communication with the chromium-contaminated waste is oxidized by ferric sulfate. The ferrous sulfate and sulfuric acid produced by oxidation contact the waste, whereupon the ferrous sulfate is oxidized to ferric sulfate. A portion of the ferric sulfate can be withdrawn from the treated waste and recycled onto the iron pyrite, thereby promoting pyrite oxidation and chromium-contaminated waste stabilization.

In still another embodiment, the iron pyrite oxidation may be catalyzed microbiologically using an iron-oxidizing microorganism such as bacteria, for example *Thiobacillus ferrooxidans*, to generate the ferrous sulfate/sulfuric acid mix for stabilizing chromium. Alternatively, iron pyrite oxidation may be catalyzed by passing humid air through the iron pyrite layer or by adding at least one chemical oxidant such as a peroxygen compound. The peroxygen compound can be a peroxide (e.g., hydrogen peroxide, calcium peroxide, magnesium peroxide and the like), a persulfate, permanganate, perborate, percarbonate and the like.

In a further embodiment of the present invention, the alkaline chromium-contaminated waste may be treated with sufficient amounts of ferrous sulfate and sulfuric acid to neutralize the surface alkali and pore water and to stabilize readily leached hexavalent chromium. Slow but controlled addition of ferrous sulfate/sulfuric acid may then be applied to the waste matrix via controlled oxidation of iron pyrite to stabilize the slowly release alkalinity and leached chromium.

Figure 6:
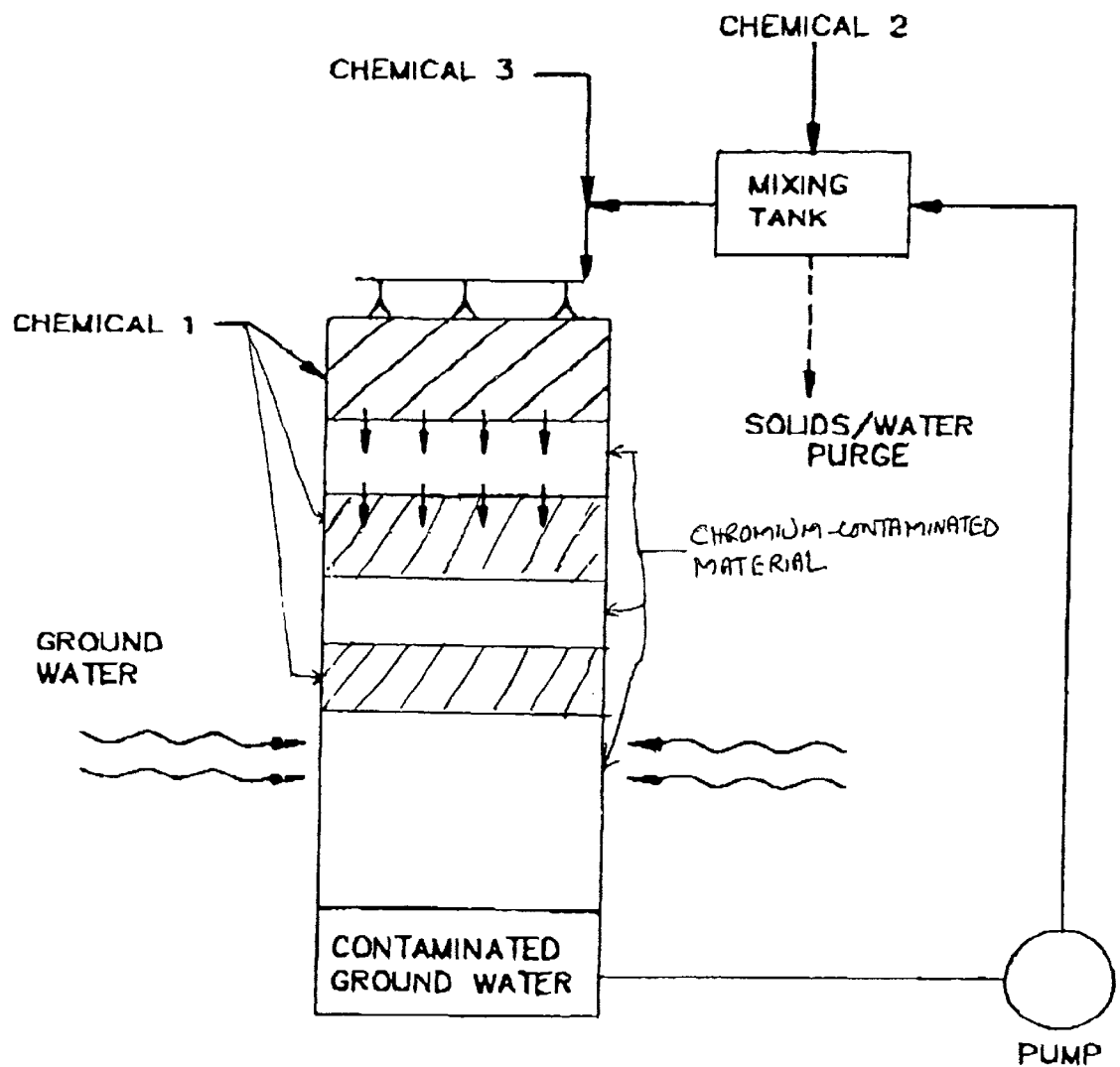
FIG. 6 depicts still another embodiment of the in situ system of the invention wherein iron pyrite is injected at various depths of a waste column to create alternating iron pyrite and waste layers.

In yet another embodiment of the present of the present invention, an aqueous slurry of iron pyrite can be injected at various depths of a waste column to create alternating iron pyrite and waste layers (FIG. 6). In a preferred mode of operation, the top iron pyrite layer may first be oxidized to ferrous sulfate and sulfuric acid, thereby stabilizing chromium-contaminated waste right below the top pyrite layer to producing ferric ions. The ferric ions thus produced can flow downward into the next pyrite layer to produce ferrous sulfate and sulfuric acid, continuing the cycle of pyrite oxidation and waste stabilization, thereby expediting the overall chromium-contaminated waste stabilization process.

Waste stabilization with ferrous sulfate and sulfuric acid may cause significant changes in the geotechnical characteristics of the disposed waste. Generally, the permeability of the treated waste will be lower in comparison to that of the untreated waste. However, the unconfined compressive strength (UCS) may be reduced. As necessary, a low concentration of pozzalonic material (e.g., ground iron slag, silicate such as Olivine, etc.) is added (to between about 5 and 20% by weight) to the treated waste to improve (raise) the UCS of the stabilized waste.

EXAMPLE

An alkaline chromium ore processing residue (COPR) waste containing approximately 3.70 percent by weight chromium and 55 percent by weight lime (expressed as $Ca(OH)_2$) was TCLP toxic for chromium with an untreated screening TCLP chromium concentration of 140 mg/L. The waste was treated (first treatment) with 10 percent by weight ferrous sulfate heptahydrate ($FeSO_4 \cdot 7H_2O$) and 5 percent by weight ferric sulfate ($Fe_2(SO_4)_3 \cdot xH_2O$) and was analyzed for screening TCLP chromium. The screening TCLP chromium concentrations with varying elapsed time after treatment were as follows:

| TIME ELAPSED AFTER FIRST TREATMENT (days) | SCREENING TCLP-CHROMIUM (mg/L) |
|---|---|
| 0 | 0.8 |
| 3 | 2.6 |
| 7 | 7.0 |
| 28 | 14.2 |

Although the treated waste was non-TCLP toxic for chromium immediately after treatment, the screening TCLP chromium concentrations increased over time and exceeded the RCRA hazardous waste threshold TCLP concentration of 5 mg/L after 7 days. The screening TCLP chromium concentration of the treated waste continued to increase with increased elapsed time. Evidently, the first treatment provided a temporary treatment for control of the chromium leachability of the waste.

The above treated waste after 7 days of elapsed time was further treated (second treatment) with approximately 10 percent by weight sulfuric acid and 25 percent by weight ferrous sulfate heptahydrate. The screening TCLP chromium concentrations after the second treatment were as follows:

| TIME ELAPSED AFTER SECOND TREATMENT (days) | SCREENING TCLP-CHROMIUM (mg/L) |
|---|---|
| 7 | 0.9 |
| 21 | 0.6 |

The waste after the second treatment did not increase in toxicity as shown by the non-TCLP toxic concentrations of chromium at both the 7-day and 21-day screening TCLP analysis.

What is claimed is:

1. A method for reducing mobile hexavalent chromium to non-leachable trivalent chromium in alkaline chromium-contaminated particulate matter, the method comprising the steps of:

contacting a source of hexavalent chromium with ferrous ions to produce ferric ions;

oxidizing iron pyrite to produce ferrous sulfate and sulfuric acid;

contacting the alkaline chromium-contaminated particulate matter with the ferrous sulfate and the sulfuric acid for a time sufficient to convert ferrous sulfate into ferric sulfate and to reduce mobile hexavalent chromium to trivalent chromium in the particulate matter, wherein ferrous sulfate produced by oxidizing iron pyrite is a source of ferrous ions in the first contacting step.

2. A method as claimed in claim 1 wherein the iron pyrite is in fluid communication with the alkaline chromium-contaminated particulate matter.

3. A method as claimed in claim 1 wherein the source of hexavalent chromium is groundwater that comprises hexavalent chromium and wherein the first contacting step comprises the step of contacting the groundwater with ferrous ions to produce a treated groundwater that comprises ferric ions.

4. A method as claimed in claim 3, wherein the first contacting step further comprises the step of separating the ferric ions from particulate solids in the treated groundwater.

5. A method as claimed in claim 1 wherein the source of hexavalent chromium is a leachate that comprises hexavalent chromium and wherein the first contacting step comprises the step of contacting the leachate with ferrous ions to produce a treated leachate that comprises ferric ions.

6. A method as claimed in claim 5, wherein the first contacting step further comprises the step of separating the ferric ions from particulate solids in the treated leachate.

7. A method as claimed in claim 1 wherein the oxidizing step comprises the step of adding exogenous ferric salt to the iron pyrite.

8. A method as claimed in claim 1, wherein the iron pyrite is oxidized ex situ.

9. A method as claimed in claim 8, wherein the ex situ oxidation is selected from the group consisting of wet oxidation and wet air oxidation.

10. A method as claimed in claim 1 wherein the oxidizing step comprises the step of contacting the iron pyrite with ferric ions.

11. A method as claimed in claim 10 wherein the ferric sulfate is a source of ferric ions for the oxidizing step.

12. A method as claimed in claim 1 wherein the oxidizing step comprises the step of contacting the iron pyrite with a microbiological catalyst.

13. A method as claimed in claim 12 wherein the microbiological catalyst is an iron-oxidizing bacterium.

14. A method as claimed in claim 13 wherein the iron-oxidizing bacterium is *Thiobacillus ferrooxidans*.

15. A method as claimed in claim 1 wherein the oxidizing step comprises the step of passing humid air through the iron pyrite.

16. A method as claimed in claim 1 wherein the oxidizing step comprises the step of contacting the iron pyrite with a chemical oxidant.

17. A method as claimed in claim 16 wherein the chemical oxidant is a peroxygen compound.

18. A method as claimed in claim 17 wherein the chemical oxidant is selected from the group consisting of a peroxide, a persulfate, a permanganate, a perborate, and a percarbonate.

19. A method as claimed in claim 18 wherein the chemical oxidant is a peroxide selected from the group consisting of hydrogen peroxide, calcium peroxide, and magnesium peroxide.

20. A method as claimed in claim 1 further comprising the step of increasing the unconfined compressive strength of the particulate matter.

21. A method as claimed in claim 20 wherein the unconfined compressive strength is increased by adding a low concentration of a pozzalonic material to the particulate matter.

22. A method as claimed in claim 21 wherein the pozzalonic material is selected from the group consisting of a ground iron slag and a silicate.

* * * * *